United States Patent
Boughton et al.

[11] 3,768,885
[45] Oct. 30, 1973

[54] MICROSCOPE FOCUS ADJUSTMENT MECHANISM

[75] Inventors: Olin W. Boughton, Williamsville; August R. Von Langen, Tonawanda, both of N.Y.

[73] Assignee: American Optical Corporation, Cambridge, Mass.

[22] Filed: May 12, 1972

[21] Appl. No.: 252,888

[52] U.S. Cl. .................................. 350/84, 350/255
[51] Int. Cl. ......................................... G02b 21/24
[58] Field of Search ............................. 350/84, 255

[56] References Cited
UNITED STATES PATENTS

| | | | |
|---|---|---|---|
| 3,135,817 | 6/1964 | Wrigglesworth et al. | 350/84 |
| 1,892,131 | 12/1932 | Berger | 350/84 |
| 2,000,737 | 5/1935 | Bauersfeld | 350/84 |
| 2,891,446 | 6/1959 | Maiorino | 350/84 |
| 3,260,157 | 7/1966 | Boughton | 350/84 |

FOREIGN PATENTS OR APPLICATIONS 893,619 4/1962 Great Britain .................. 350/84

*Primary Examiner*—David H. Rubin
*Attorney*—William C. Nealon et al.

[57] ABSTRACT

A microscope nosepiece coarse and fine adjustment mechanism. The nosepiece rests on a rocker arm which is swung up or down by a connecting rod which in turn is controlled by a disc cam. The cam is rotatable directly for coarse adjustment and by a reduction gear train for fine adjustment.

5 Claims, 3 Drawing Figures

Patented Oct. 30, 1973  3,768,885

MICROSCOPE FOCUS ADJUSTMENT MECHANISM

BACKGROUND OF THE INVENTION

This invention relates in general to mechanical movements and more particularly to a combined coarse and fine adjustment mechanism especially adapted for use in connection with the focusing of microscopes.

In the prior art, microscopes have included adjustment mechanisms for adjustment of the stage relative to the nosepiece or of the nosepiece relative to the stage. These mechanisms often include provision for coarse and fine adjustment. U. S. Pat. No. 3,135,817 to Wrigglesworth and Jasienski discloses one such coarse and fine adjustment mechanism for the nosepiece of a microscope. In the Wrigglesworth et al apparatus, a compound cam and associated linkage are used. The cam is rotated for coarse adjustment of the nosepiece and axially translated for fine adjustment.

SUMMARY OF THE INVENTION

It is an object of this invention to provide a coarse and fine adjustment mechanism for a microscope nosepiece which is more economical to manufacture and structurally more rugged than prior art arrangements.

Further objects, advantages and features of this invention will become apparent from the following description of one embodiment thereof, given in connection with the accompanying drawing.

Briefly, this invention is practiced in a prepared embodiment as follows: A microscope having a movable nosepiece resting on a linkage. The movement of the linkage is controlled, to adjust the nosepiece along the microscope optical axis, by a cam which is rotatably mounted on the microscope. The cam is rotatable by a reduction gear train for fine adjustment; cam and gear train being rotatable together for coarse adjustment.

DRAWING

DESCRIPTION

Figure 1:
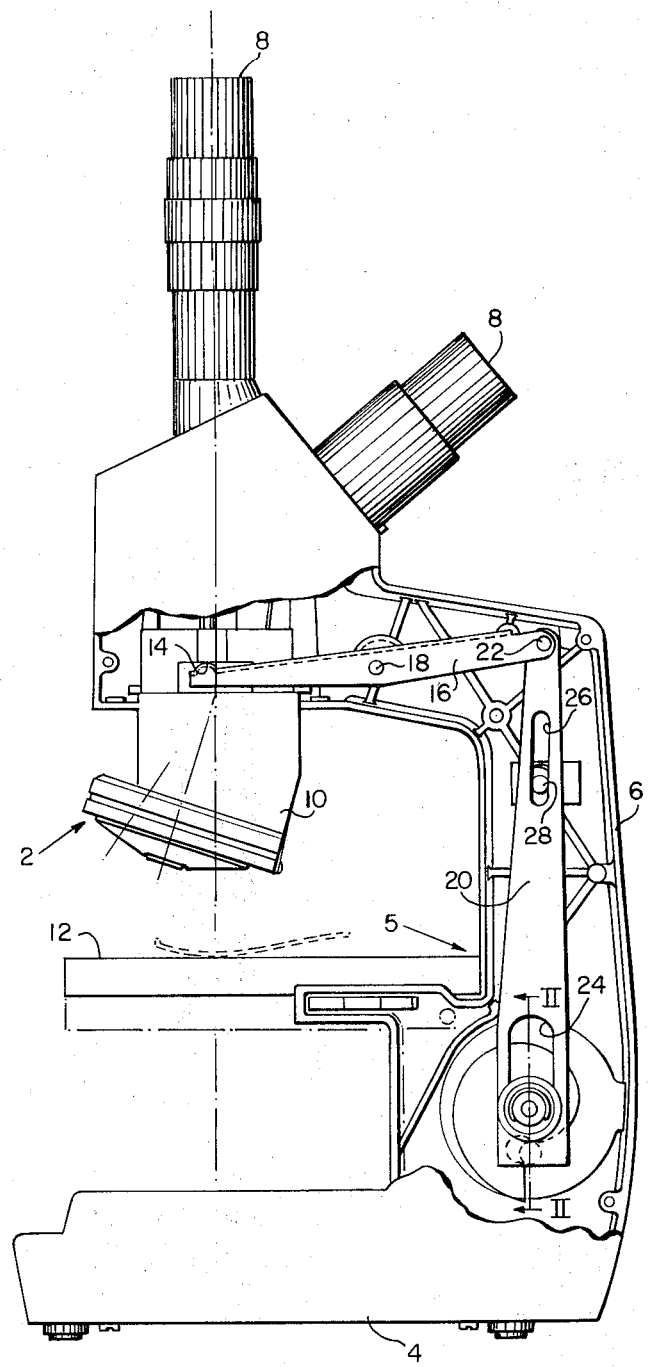
FIG. 1 is a side elevation view, partly broken away, showing a microscope including an adjustment mechanism in accordance with this invention.

Referring now to FIG. 1, a microscope is indicated generally at 2 and includes a base 4 from which a support arm 6 extends upwardly, the base 4 and arm 6 together forming the microscope frame 5. The microscope 2 also includes one or more eyepieces 8, a nosepiece 10 and a stage 12, all mounted relative to the frame 5.

Nosepiece 10 is slidably mounted to the support arm 6 and rests on a bearing surface 14 at the end of a rocker arm 16. Rocker arm 16 is mounted for universal rocking motion relative to support arm 6 on a pivot or fulcrum 18. The other end of rocker arm 16 and a connecting rod 20 are pivotally connected by a suitable bearing or pin 22. Connecting rod 20 has an aperture 24 near its lower end.

Figure 2:
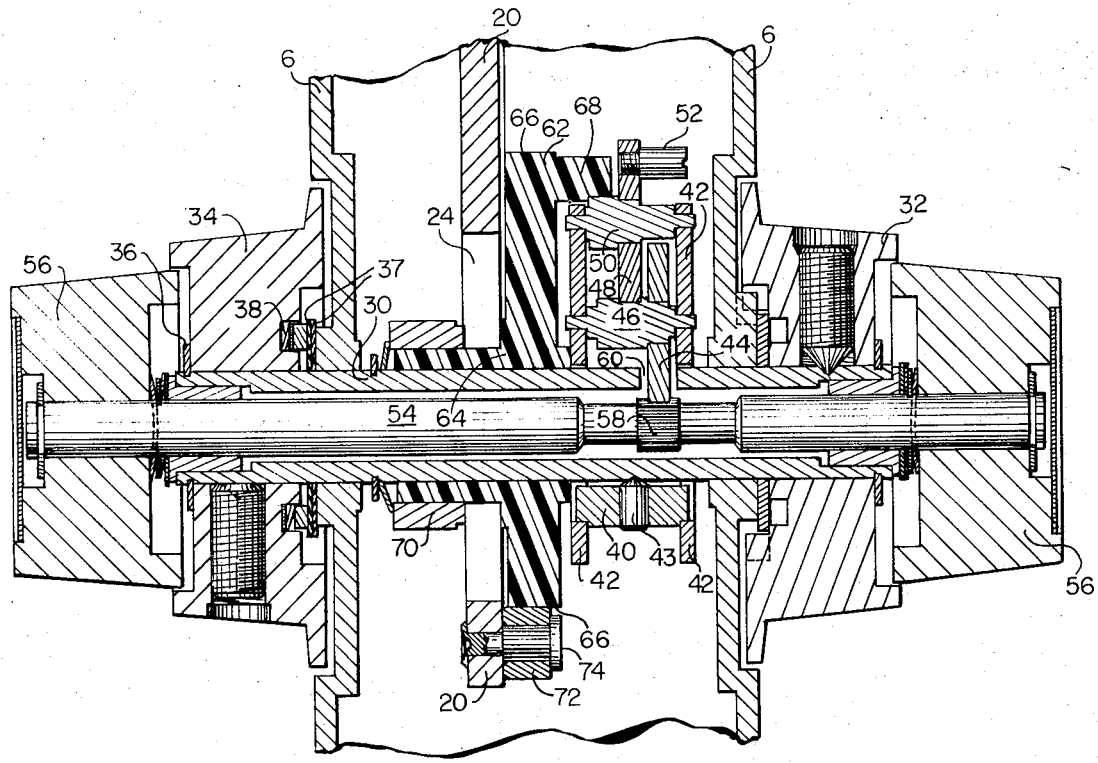
FIG. 2 is an enlarged sectional view taken along the lines II—II of FIG. 1.

Referring now to FIG. 2, a sectional view is shown of the lower end of connecting rod 20 and its associated mechanism. A hollow shaft 30 is rotatably mounted, on suitable bearings, transversely through the support arm 6. An operating handwheel 32 is fixed to shaft 30 at one of its ends. A second operating handwheel 34 is mounted on the other end of shaft 30 for limited axial movement relative to the shaft. Handwheel 34 is urged against a retaining ring 36 by an annular spring 38 mounted to the handwheel 34, between the handwheel and the support arm 6. A friction ring 37 is provided on the support arm 6 and a similar friction ring 37 is mounted on the spring 38. Spring 38 urges the friction rings 37 together to provide a frictional resistance against undesired rotation of the wheels 32 and 34 and shaft 30. Between handwheels 32 and 34, a gear box assembly 40 includes a pair of parallel plates 42 and is fixed to shaft 30 by a suitable fastener 43.

A first reduction gear 44 and a pinion 46 are rotatably mounted together between parallel plates 42. Gear 44 and pinion 46 are integrally formed as a compound gear. An identical compound gear includes a second reduction gear 48 and a pinion 50 rotatably mounted between plates 42. The pinion 46 engages the second reduction gear 48.

A second shaft 54 is rotatably mounted coaxially within and through the hollow shaft 30 and has a control handwheel 56 at each of its ends. Shaft 54 includes a pinion 58 which engages the first reduction gear 44. Shaft 30 has a transverse slot or aperture 60 through which the first reduction gear 44 extends to engage pinion 58.

Figure 3:
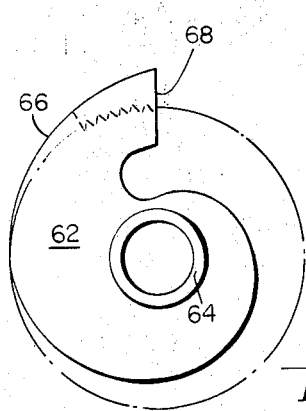
FIG. 3 is a detail of a cam which is a feature of this invention.

A disc cam 62 is mounted for rotation on the hollow shaft 30. Cam 62 includes an extended central core 64 forming an internal bearing surface. Cam 62 has a peripheral cam surface 66 of a generally involute shape and also includes an integral internal gear segment 68. (See also FIG. 3). Gear 68 engages pinion 50.

The connecting rod 20 depends from bearing 22 and fits, by means of aperture 24, over the shaft 30 and core 64 of the cam 62. A suitable retaining ring 70 maintains the relative position, on shaft 30, between connecting rod 20 and cam 62. The lower end of connecting rod 20 has a cam follower 72 suitably mounted by a fastener or spindle 74. Connecting rod 20 and cam follower 72 are held in contact with cam surface 66 by the upward pull of rocker arm 16, this upward pull being maintained by gravity on nosepiece 10 acting on the bearing surface 14.

In operation, inner handwheels 32 and 34 are rotated in either direction as desired, shaft 30 and gear box assembly 40 being thereby rotated. This causes the direct rotation, without use of the gears, of the cam 62. The resulting vertical adjustment of the connecting rod 20 acts through the rocker arm 16 to raise or lower the nosepiece 10. It should be pointed out here that the cam acts on the connecting rod only to move it downward (to raise the nosepiece). In the opposite direction, the cam simply permits the connecting rod to rise, the nosepiece being lowered by gravity. In this mode of operation, with direct rotation of the cam, coarse adjustment of the nosepiece is made. Handwheels 32 and 34 are held still when not in use by the braking action of spring 38 and friction rings 37 holding hand-wheel 34 to support arm 6.

With handwheels 32 and 34 held stationary, rotation of the outer handwheels 56, with shaft 54 and pinion 58, operates the gear reduction system. Pinion 58 acts through gear 44, pinion 46, gear 48, pinion 50, and internal gear 68, to rotate cam 62 through a displacement which is small in relating to the handwheel displacement. Reaction on the gear box 40 and shaft 30 is prevented by the braking friction at rings 37. That is, during fine adjustment, the coarse adjustment drive is held stationary. This mode of operation provides fine adjustment of the mechanism and nosepiece 10.

Internal gear 68 is a segment of approximately 30°; thus there is a limit to the displacement that can be provided by the fine adjustment mechanisms alone. This range can, of course, be extended as desired by providing a gear segment 68 larger than 30°. In order to prevent the pinion 50 and gear segment 68 from running out of engagement, a pin 52 is fixed to, and extends from, gear 48 so as to prevent rotation beyond the desired limits.

The foregoing description of an embodiment of this invention is given by way of illustration and not of limitation. The concept and scope of the invention are limited only by the following claims and equivalents thereof which may occur to others skilled in the art.

What is claimed is:

1. A microscope having a frame comprising a base and a support arm extending upwardly therefrom, a nosepiece slidably mounted on said support arm at the upper end thereof, and an adjustment mechanism by which to move said nosepiece relative to said support arm, said adjustment mechanism including:

a linkage mounted relative to said support arm and operatively connected to said nosepiece, a cam rotatably mounted relative to said frame and operatively engaged with said linkage for movement therewith to effect the adjustment of said nosepiece, a reduction gear train operatively engaged with said cam, coarse adjustment means to rotate said cam directly, and fine adjustment means to rotate said cam through said reduction gear train, said reduction gear train being mounted on a gear box, said gear box being integral with said coarse adjustment means so that rotation of said coarse adjustment means is effective to rotate said gear box, gear train, and cam as a unit.

2. The apparatus defined in claim 1 in which said linkage includes a rocker arm mounted to said support arm on a fulcrum, and a connecting rod pivotally connected to said rocker arm at a point other than said fulcrum, said connecting rod being operatively engaged with said cam.

3. The apparatus defined in claim 1 in which said fine adjustment means includes a pinion in operative engagement with said gear train.

4. The apparatus defined in claim 3 in which said coarse adjustment means includes a hollow shaft rotatably mounted relative to said frame and said fine adjustment means includes a second shaft rotatably mounted within said hollow shaft, said pinion being integral with said second shaft, said hollow shaft defining an aperture through which said pinion communicates with said reduction gear train.

5. The apparatus defined in claim 1 wherein said cam includes an integral internal gear segment in operative engagement with said reduction gear train.

* * * * *

UNITED STATES PATENT OFFICE
CERTIFICATE OF CORRECTION

Patent No. 3,768,885   Dated October 30, 1973

Inventor(s) Olin W. Boughton

It is certified that error appears in the above-identified patent and that said Letters Patent are hereby corrected as shown below:

[73] Assignee: American Optical Corporation,
Cambridge, Massachusetts

Should read:

[73] Assignee: American Optical Corporation,
Southbridge, Massachusetts

Signed and sealed this 4th day of February 1975.

(SEAL)
Attest:

McCOY M. GIBSON JR.            C. MARSHALL DANN
Attesting Officer              Commissioner of Patents